(12) United States Patent
Tsengas

(10) Patent No.: US 6,886,739 B1
(45) Date of Patent: May 3, 2005

(54) FOOD AND TREAT DISPENSER

(76) Inventor: Steven Tsengas, 7768 Litchfield Dr., Mentor, OH (US) 44060

( * ) Notice: Subject to any disclaimer, the term of this patent is extended or adjusted under 35 U.S.C. 154(b) by 380 days.

(21) Appl. No.: 09/590,815

(22) Filed: Jun. 9, 2000

Related U.S. Application Data

(60) Provisional application No. 60/193,875, filed on Mar. 31, 2000.

(51) Int. Cl.$^7$ ............................................... B65D 91/00
(52) U.S. Cl. .................... 232/43.1; 221/64; 119/51.01; 220/229; 426/115
(58) Field of Search .............................. 232/43.1, 43.4, 232/44, 1 A; 221/64, 65; 119/51.01, 707; 222/206, 212, 213; 220/229; 150/150, 900; 426/115, 805; 383/43

(56) References Cited

U.S. PATENT DOCUMENTS

| | | | |
|---|---|---|---|
| 1,296,353 A | | 3/1919 | Auer |
| 2,457,345 A | * | 12/1948 | Carline ......................... 221/64 |
| 2,868,254 A | * | 1/1959 | Saad ........................... 150/151 |
| 2,885,124 A | | 5/1959 | Green et al. |
| 3,063,487 A | * | 11/1962 | Mullin ......................... 150/150 |
| 3,315,402 A | | 4/1967 | Scott et al. |
| 3,349,972 A | | 10/1967 | Whiteford |
| 3,763,826 A | * | 10/1973 | Portelli ....................... 119/52.1 |
| 3,899,100 A | * | 8/1975 | Riguad ........................ 220/229 |
| 4,112,991 A | * | 9/1978 | Barbaresi ..................... 150/33 |
| 4,311,257 A | | 1/1982 | Grieco et al. |
| 4,328,904 A | * | 5/1982 | Iverson ....................... 220/256 |
| 4,629,235 A | * | 12/1986 | Logue ......................... 294/19.2 |
| 4,871,093 A | * | 10/1989 | Burshtain et al. ............ 222/213 |
| 4,884,717 A | * | 12/1989 | Bussard et al. .............. 220/229 |
| 4,917,267 A | | 4/1990 | Laverdure |
| 4,966,312 A | | 10/1990 | Waring |
| 5,472,281 A | * | 12/1995 | Phelps ......................... 383/43 |
| 5,588,561 A | | 12/1996 | Ness |
| 5,623,980 A | * | 4/1997 | McMahon ................... 150/150 |
| 5,772,090 A | * | 6/1998 | Rodriguez ................... 224/251 |
| 5,965,182 A | * | 10/1999 | Lindgren ..................... 426/104 |
| 6,029,850 A | * | 2/2000 | Pate et al. .................... 221/64 |
| 6,176,384 B1 | * | 1/2001 | Voloshin ..................... 220/253 |

* cited by examiner

Primary Examiner—William L. Miller
(74) Attorney, Agent, or Firm—John D. Guguotta; Olen L York, III

(57) ABSTRACT

A food and treat dispenser comprises an enclosed container fabricated from a relatively soft pliable polymeric material having at least one aperture to permit food or treats to be inserted into and removed from the enclosed container. More preferably, the food and treat dispenser is fabricated as an enclosed container having a base portion, an elongated central portion and a top portion. The base portion includes a selectively openable self-closing second aperture to allow food or treats to be removed from the integral one-piece enclosed container. Preferably, the top portion also includes a selectively openable self-closing first aperture to allow food or treats to be inserted through the first aperture into the enclosed container. If desired, a quick disconnect chain can be inserted through openings in the sidewall of the elongated central portion or the food and treat dispenser can include a hook to allow the food and treat dispenser to be carried, for example, around a user's neck or wrist or attached to, for example, a belt, belt loop, pet leash handle or pet collar.

19 Claims, 2 Drawing Sheets

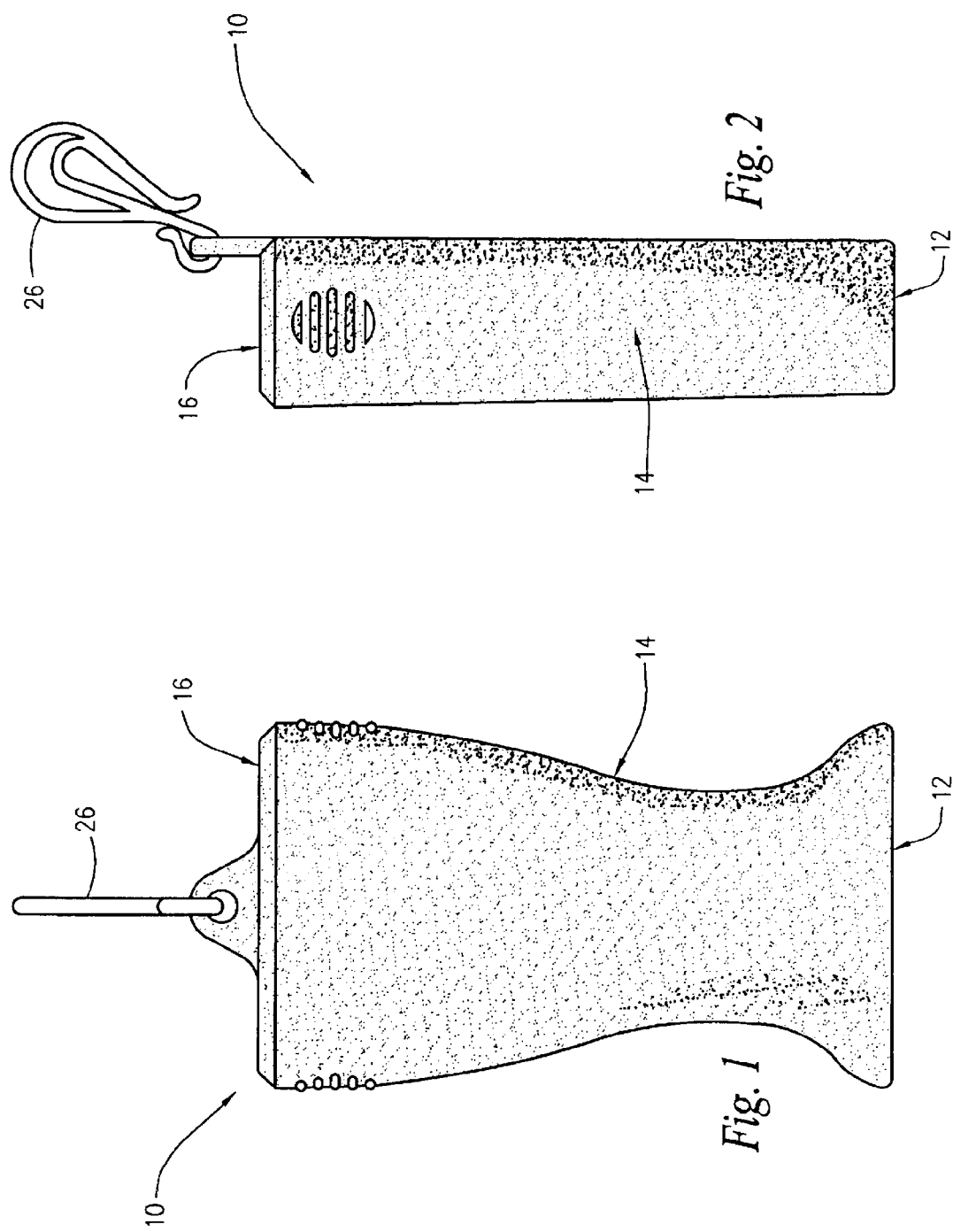

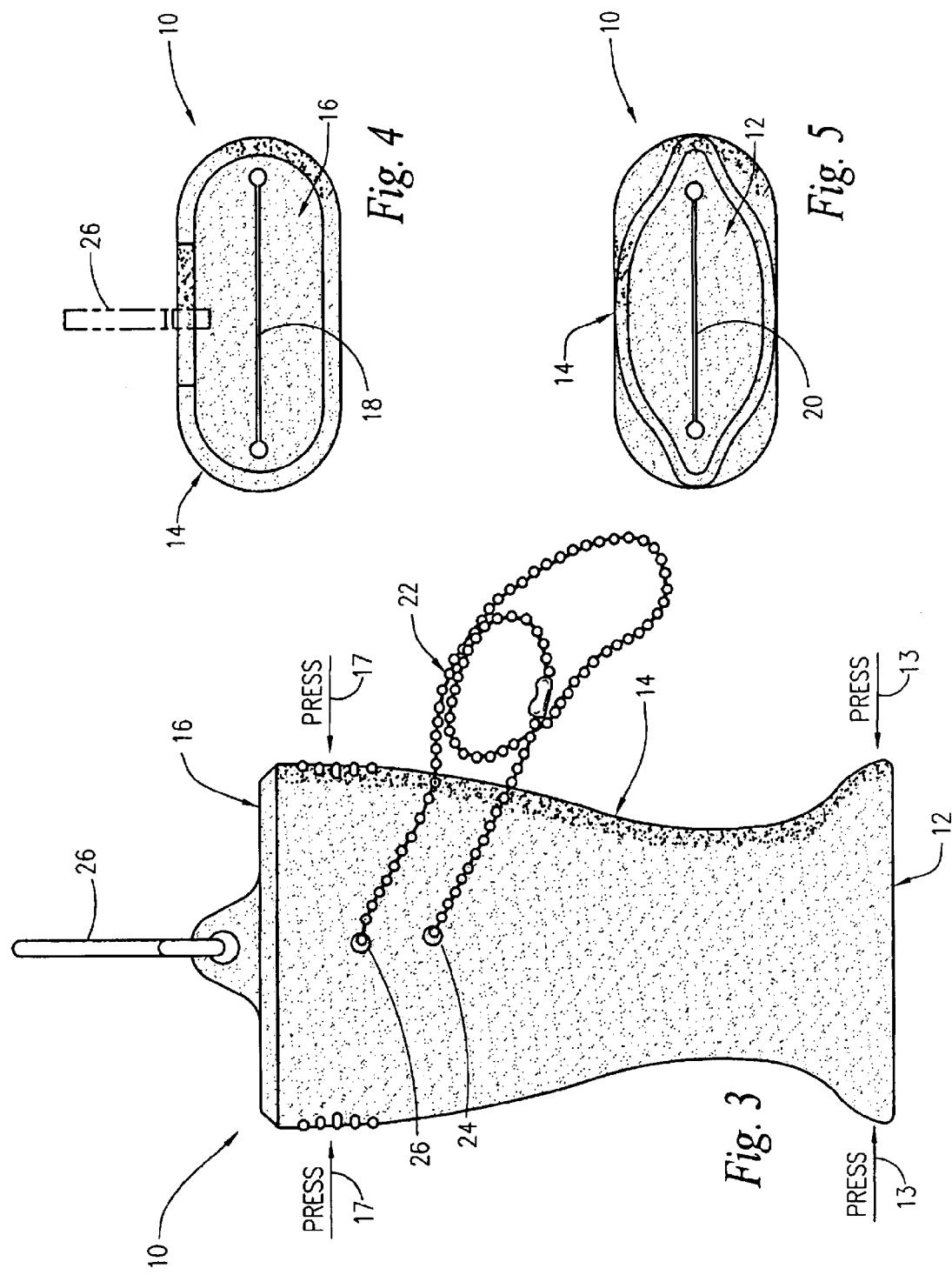

FOOD AND TREAT DISPENSER

This application claims the benefit of U.S. provisional application No. 60/193,875 filed Mar. 31, 2000.

BACKGROUND AND SUMMARY OF THE INVENTION

The present invention relates generally to new and novel improvements in a food and treat dispenser. More particularly, the present invention relates to a food and treat dispenser that is portable, durable and lightweight and provides a convenient container and dispenser to carry, for example, food and treats, when walking, hiking or performing other physical activities, with or without pets.

When walking, hiking or performing other physical activities, with or without pets, it is often desirable to take along food or treats. It is currently necessary to carry such food or treats in a pants, shirt or jacket pocket, or in a bag, or perhaps in a back pack or fanny pack. These prior art methods have disadvantages which include being inconvenient, damaging the food or treats being carried and/or causing the container to become dirty due to food or treat "crumbs."

Accordingly, an object of the present invention is the provision of a food and treat dispenser that is lightweight and convenient and is capable of being operated using one hand.

Another object of the present invention is to provide a food and treat dispenser that is easy to load with food or treats and allows such food or treats to be easily dispensed.

Yet another object of the present invention is to provide a food and treat dispenser which can be carried on a user's belt or around a user's neck and which is easy to clean and keeps the user's cloths clean.

These and other objects of the present invention are attained by a food and treat dispenser that consists of an enclosed container fabricated from a relatively soft pliable polymeric material having at least one aperture to permit food and treats to be inserted into and removed from the enclosed container. More preferably, the food and treat dispenser in accordance with the present invention is fabricated as an integral one-piece enclosed container having a relatively flat top portion. The relatively flat top portion includes an aperture to allow food and treats to be inserted through the aperture into the integral one-piece enclosed container and the relatively flat base portion also includes an aperture to allow food and treats to be removed from the integral one-piece enclosed container. The aperture in the relatively flat top portion is preferably longer than the aperture in the relatively flat base portion. If desired, a quick disconnect chain can be inserted through openings in the sidewall of the elongated cylindrical or oval central portion or the food and treat dispenser can include a hook to allow the food and treat dispenser to be carried, for example, around a user's neck or wrist or attached to, for example, a belt, belt loop, pet leash handle or pet collar.

Other advantages and novel features of the present invention will become apparent in the following detailed description of the invention when considered in conjunction with the accompanying drawings.

BRIEF DESCRIPTION OF THE DRAWINGS

FIG. 1 is a front elevational view of a food and treat dispenser in accordance with a preferred embodiment of the present invention.

FIG. 2 is a side elevational view of the food and treat dispenser in accordance with a preferred embodiment of the present invention shown in FIG. 1, the other side elevational view being a mirror image thereof.

FIG. 3 is a rear elevational view of the food and treat dispenser in accordance with a preferred embodiment of the present invention shown in FIG. 1.

FIG. 4 is a top plan view of the food and treat dispenser in accordance with therefor a preferred embodiment of the present invention shown in FIG. 1.

FIG. 5 is a bottom plan view of the food and treat dispenser in accordance with a preferred embodiment of the present invention shown in FIG. 1.

DETAILED DESCRIPTION

In the following detailed description of a preferred embodiment of the present invention, reference is made to the accompanying drawing which, in conjunction with this detailed description, illustrate and describe a preferred embodiment of a food and treat dispenser in accordance with the present invention. Referring now to the drawings, which show a front elevational view of a food and treat dispenser in accordance with a preferred embodiment of the present invention being carried on a user's belt, a side elevational view of the food and treat dispenser in accordance with the preferred embodiment of the present invention shown in FIG. 1, the other side elevational view being a mirror image thereof, a rear elevational view of the food and treat dispenser in accordance with the preferred embodiment of the present invention shown in FIG. 1, a top plane view of the food and treat dispenser in accordance with the preferred embodiment of the present invention shown in FIG. 1 and a bottom plan view of the food and treat dispenser in accordance with the preferred embodiment of the present invention show in FIG. 1, respectively, food and treat dispenser is generally identified by reference number 10. Food and treat dispenser 10 is generally an enclosed container fabricated from a relatively soft pliable polymeric material having at least one aperture to permit food or treats to be inserted into and removed from the enclosed container. More particularly, food and treat dispenser 10 in accordance with the present invention is fabricated as an integral one-piece enclosed container having a relatively flat base portion 12, elongated cylindrical or oval central portion 14, and a relatively flat top portion 16. Relatively flat top portion 16 preferably includes a first aperture 18 to allow food and treats to be inserted through the first aperture 18 into the integral one-piece enclosed container and relatively flat base portion 12 includes a second aperture 20 to allow food or treats to be removed from the integral one-piece container. The first aperture 18 in relatively flat top portion 16 is preferably longer than the second aperture 20 in relatively flat base portion 12. If desired, quick disconnect chain 22 can be inserted through openings 24 in the sidewall of elongated cylindrical or oval central portion 14 or food and treat dispenser 10 can include hook 26 to permit food or treat dispenser 10 to be carried, for example, around a user's neck or wrist or attached to, for example, a belt, belt loop, pet leash handle or pet collar.

To use the food and treat dispenser 10, one of the self-closing apertures 18, 20 is opened by pressing the sides of the dispenser 10 adjacent the desired aperture 18, 20, shown by arrows 17, 13, respectively and inserting items of food or treats through the opened aperture 18, 20. Since the apertures 18, 20 are self-closing, releasing the sides of the dispenser 10 allows apertures 18, 20 to close, thereby retaining any items of food or treats that have been inserted into the dispenser 10. When dispensing items of food or treats from dispenser 10, the sides of dispenser are again pressed, preferably at 13, which opens the second aperture 20 permitting items of food or treats to be dispensed from dispenser 10. Although the preferred embodiment of dispenser 10 includes the first aperture 18 for inserting items of food or treats into dispenser 10 and the second aperture 20 for dispensing items of food or treats from dispenser 10, items of food or treats could be inserted through and dispensed from a single aperture, such as the second aperture 20.

Although the present invention has been described above in detail, the same is by way of illustration and example only and is not to be taken as a limitation on the present invention. For example, food and treat dispenser 10 in accordance with the present invention could be modified in various ways. Accordingly, the scope and content of the present invention are to be defined only by the terms of the appended claims.

What is claimed is:

1. A food and treat dispenser comprising:

an enclosed container having a top portion, a central portion and a bottom portion and at least one of said top portion and said bottom portion includes a selectively openable first aperture to permit food to be one or both of inserted into and removed from said enclosed container, each of said top portion and said bottom portion is relatively flat for self-supporting said dispenser on a planar surface; and at least one item of food within said enclosed container, said at least one item of food being one or both of inserted into and removed from said enclosed container through said first aperture.

2. The food and treat dispenser in accordance with claim 1, wherein said food and treat dispenser is fabricated from a relatively soft pliable polymeric material.

3. The food and treat dispenser in accordance with claim 1, wherein said first aperture is positioned in said top portion.

4. The food and treat dispenser in accordance with claim 1, wherein said first aperture is positioned in said bottom portion.

5. The food and treat dispenser in accordance with claim 1, wherein said central portion has a substantially cylindrical or oval configuration.

6. The food and treat dispenser in accordance with claim 1, wherein said food and treat dispenser includes a chain to facilitate carrying said food and treat dispenser, said chain sufficiently sized to accommodate placement about a user's neck and adapted for quick disconnection from said dispenser.

7. The food and treat dispenser in accordance with claim 1, wherein said food and treat dispenser includes a hook to facilitate carrying said food and treat dispenser.

8. A food and treat dispenser comprising:

an enclosed container having a top portion, a central portion and a bottom portion said top portion including a selectively openable first aperture and said bottom portion including a selectively openable second aperture, wherein said first and said second apertures permit food to be one or both of inserted into and removed from said enclosed container, each of said top portion and said bottom portion is relatively flat for self-supporting said dispenser on a planar surface; and at least one item of food within said enclosed container, said at least one item of food being one or both of inserted into and removed from said enclosed container through said first aperture or said second aperture and one or both of said food or treats removed from and inserted into the enclosed container through said first aperture or said second aperture.

9. The food and treat dispenser in accordance with claim 8, wherein said food and treat dispenser is fabricated from a relatively soft pliable polymeric material.

10. The food and treat dispenser in accordance with claim 8, wherein said central portion has a substantially cylindrical or oval configuration.

11. The food and treat dispenser in accordance with claim 8, wherein said food and treat dispenser includes a chain to facilitate carrying said food and treat dispenser, said chain sufficiently sized to accommodate placement about a user's neck and adapted for quick disconnection from said dispenser.

12. The food and treat dispenser in accordance with claim 8, wherein said food and treat dispenser includes a hook to facilitate carrying said food and treat dispenser.

13. The food and treat dispenser in accordance with claim 8, wherein said first aperture is longer than said second aperture.

14. The food and treat dispenser in accordance with claim 13, wherein said food and treat dispenser is fabricated from a relatively soft pliable polymeric material.

15. The food and treat dispenser in accordance with claim 13, wherein said central portion has a substantially cylindrical or oval configuration.

16. The food and treat dispenser in accordance with claim 13, wherein said food and treat dispenser includes a chain to facilitate carrying said food and treat dispenser, said chain sufficiently sized to accommodate placement about a user's neck and adapted for quick disconnection from said dispenser.

17. The food and treat dispenser in accordance with claim 13, wherein said food and treat dispenser includes a hook to facilitate carrying said food and treat dispenser.

18. The food and treat dispenser in accordance with claim 8, wherein said first aperture and said second aperture are each selectively openable when inward pressure is applied to said container body.

19. The food and treat dispenser in accordance with claim 8, wherein at least one aperture selected from said first aperture or said second aperture is selectively openable by inward pressure applied parallel to a length of said first aperture or said second aperture proximate both ends of said first aperture or said second aperture.

* * * * *